United States Patent [19]
Anderson

[11] Patent Number: 5,794,495
[45] Date of Patent: Aug. 18, 1998

[54] ANIMAL GUARD APPLICATOR

[75] Inventor: Dwight Anderson, Ardmore, Okla.

[73] Assignee: Oklahoma Gas & Electric Company, Oklahoma City, Okla.

[21] Appl. No.: 719,673

[22] Filed: Sep. 25, 1996

[51] Int. Cl.[6] ............................................. B25B 23/16
[52] U.S. Cl. .................... 81/53.1; 294/19.1; 29/235; 29/278
[58] Field of Search ....................... 81/53.1; 294/19.1; 29/887, 453, 758, 235, 278; 174/5 R

[56] References Cited

U.S. PATENT DOCUMENTS

| | | | |
|---|---|---|---|
| 2,483,380 | 9/1949 | Duffy | 29/229 |
| 2,483,383 | 9/1949 | Heimann et al. | 81/5.1 |
| 2,901,817 | 9/1959 | Steyer | 29/229 |
| 3,040,420 | 6/1962 | Kulp | 29/229 |
| 3,228,101 | 1/1966 | Madeira | 29/229 |
| 3,681,840 | 8/1972 | Pool | 29/229 |
| 3,813,750 | 6/1974 | Kerr | 29/229 |
| 4,280,265 | 7/1981 | Murphy | 29/229 |
| 4,577,382 | 3/1986 | Weglage | 29/229 |
| 4,582,352 | 4/1986 | Filter et al. | 81/53.1 X |
| 4,689,865 | 9/1987 | Chamblee | 29/229 |
| 4,776,245 | 10/1988 | Gustavsson | 81/302 |
| 4,965,930 | 10/1990 | Wnukowski | 81/53.1 X |
| 5,062,191 | 11/1991 | Carr | 29/229 |
| 5,174,177 | 12/1992 | Jeromson, Jr. et al. | 81/486 |
| 5,593,196 | 1/1997 | Baum et al. | 81/53.1 X |
| 5,603,543 | 2/1997 | Ratte | 294/19.1 X |
| 5,650,594 | 7/1997 | Urnovitz | 174/139 |

*Primary Examiner*—D. S. Meislin
*Attorney, Agent, or Firm*—Dunlap & Codding, P.C.

[57] ABSTRACT

An apparatus and method for positioning an animal guard on a transformer insulator elevated a remote distance above the ground by an individual located on the ground is provided. The apparatus includes an elongated pole and a guard applicator. The pole has a first end positionable near the ground and a second end extendible so that the second end is positionable adjacent the insulator. The guard applicator has a first end and a second end, the first end connected to the second end of the elongated pole, the second end having a pair of outer prongs spaced apart a distance from one another so that the outer prongs are slidably positionable into a pair lateral loops formed on the guard. The second end of the applicator having a pair of support surfaces positioned adjacent the outer prongs to support the guard in cooperation with the outer prongs in a substantially horizontal position when the guard is positioned on the applicator with the outer prongs positioned in the lateral loops of the guard device and the pole is in a substantially vertical orientation.

5 Claims, 5 Drawing Sheets

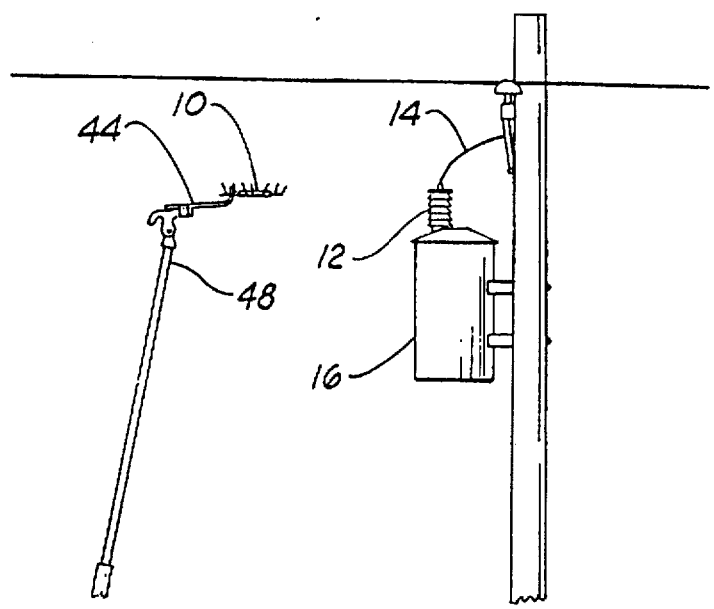
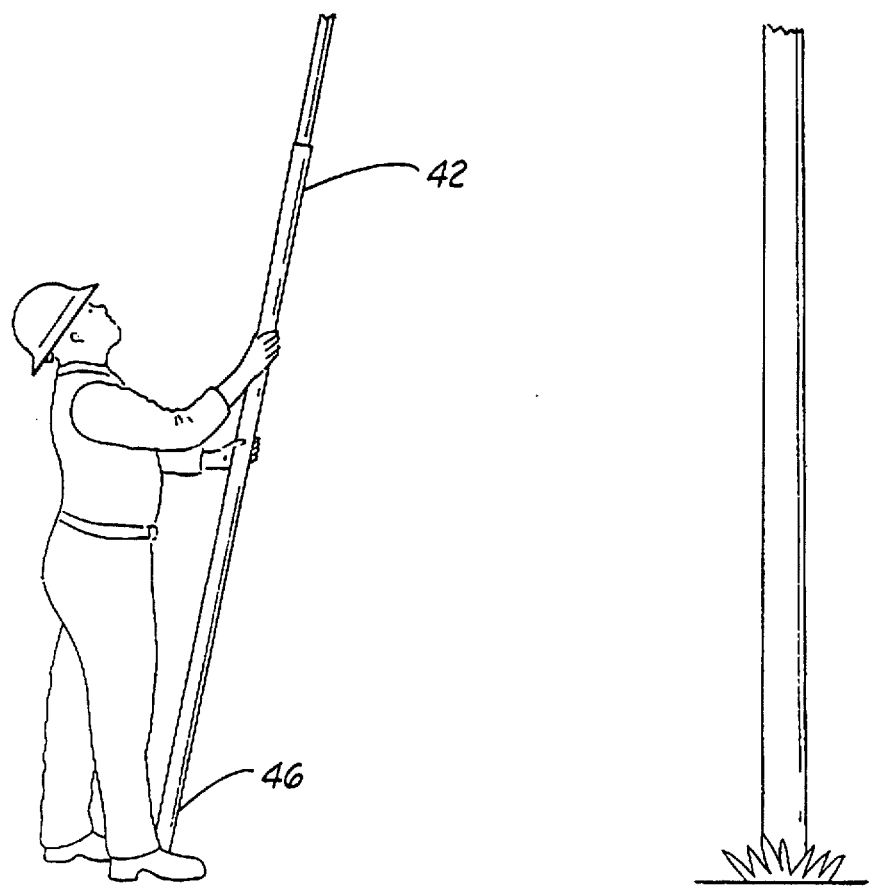
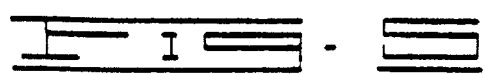
FIG. 9

ANIMAL GUARD APPLICATOR

BACKGROUND OF THE INVENTION

1. Field of the Invention

The present invention relates generally to applicator tools, and more particularly, by not by way of limitation, to an applicator for positioning an animal guard on a transformer insulator situated a remote distance above the ground.

2. Description of Related Art

It is a common sight to see animals, such as squirrels, climbing up and down utility poles and walking along electrical transmission lines. These animals are not in danger of being electrocuted as they are walking along the transmission lines so long as the animals do not come into simultaneous contact with two lines having a potential difference. One particular location along a power system where such a difference in potential exists is between a transformer and the transmission line running into the transformer. Transformers are used for "stepping up" alternating current to high voltages for long distance power transmission and for "stepping down" the voltage at the point of consumption. Due to the difference in potential between the transmission line and the transformer, an animal that does come into contact with the transmission line and the transformer simultaneously will be electrocuted and possibly cause a fuse in the power system to blow.

To prevent arcing between the transmission line and the transformer, an insulator is provided about the transmission line proximate where the transmission line extends to the housing of the transformer. In many instances, the insulator may act as a bridge for an animal moving between the transmission line and the transformer and thus cause the animal not to touch the transmission line and the transformer simultaneously. However, in other instances, the length of the insulator may not be sufficient to prevent simultaneous contact.

In an attempt to prevent animals from making simultaneous contact with a transmission line and a transformer, guard devices have been successfully employed on insulators. A problem encountered with the use of such guard devices, however, is with the installation of the guard devices on insulators. Transformers are generally mounted on a utility pole so as to elevate the transformer a remote distance above the ground. An apparatus commonly referred to as a "shotgun" stick is widely used by electric serviceman to install elbows or insulators on "hot" transformers. The "shotgun" stick is constructed of an insulated material and has a claw mechanism on one end for selectively gripping an insulator so that the insulator can be stabbed into the transformer housing.

One particular animal guard, known as the "New Guthrie" squirrel guard has been configured so that it can be grasped with a "shotgun" stick. The problem with using a "shotgun" stick to position a guard on the insulator is that the "shotgun" stick grasps the animal guard in such a manner that the animal guard extends from the "shotgun" stick substantially along the longitudinal axis of the "shotgun" stick, and the shape of the "shotgun" stick is not capable of being altered. Consequently, installation of the animal guard with a "shotgun" stick requires that a workman be positioned substantially level with the insulator. This is normally accomplished in one of two ways. Either placing a workman in a bucket and raising the bucket until the workman is level with the transformer or having a workman climb the pole on which the transformer is mounted. Either situation is time consuming and thus costly, and more importantly, can result in serious injury to the workman.

To this end, an improved apparatus is needed for safely and efficiently positioning an animal guard on a transformer insulator situated a remote distance above the ground. It is to such an improved apparatus that the present invention is directed.

BRIEF DESCRIPTION OF THE DRAWINGS

FIG. 5 is an elevational view illustrating the use of the animal guard applicator to install the animal guard of FIG. 1 on a transformer insulator in accordance with the present invention.

DETAILED DESCRIPTION

Figure 1:
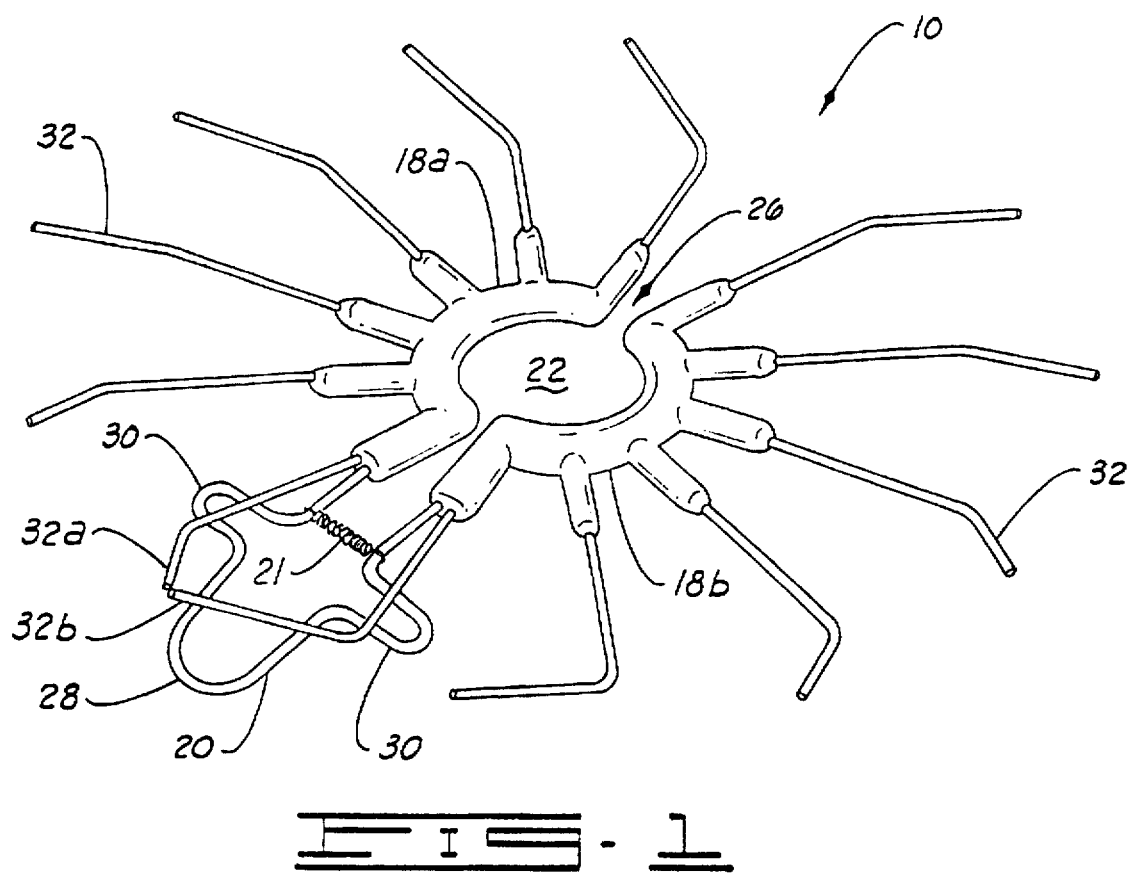
FIG. 1 is a perspective view of an animal guard.
Figure 2:
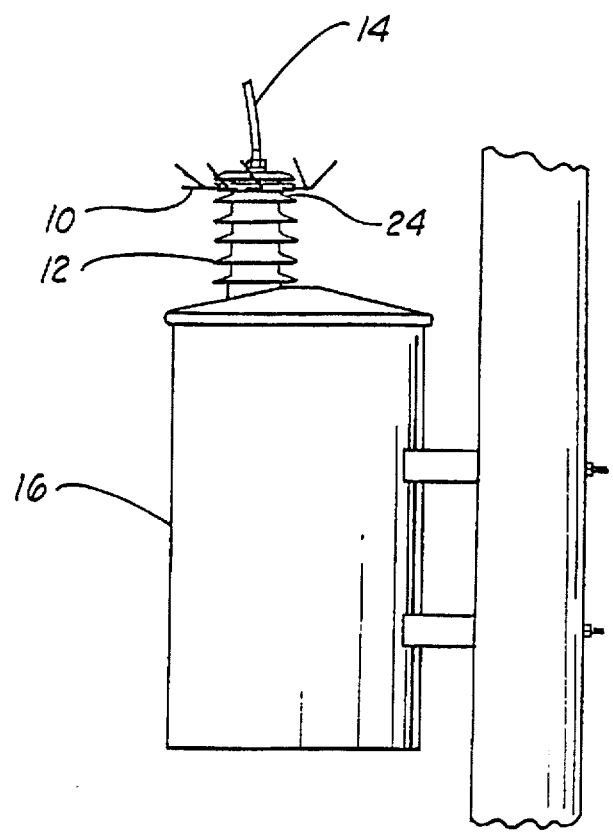
FIG. 2 is an elevational view of the animal guard of FIG. 1 shown on a transformer insulator.

Referring now to the drawings, and more particularly to FIGS. 1 and 2, shown is an animal guard 10 (also commonly referred to as a squirrel guard) which is adapted to be connected to a transformer bushing or insulator 12 (FIG. 2). As mentioned above, the insulator 12 is provided about a transmission line 14 proximate where the transmission line 14 extends to the housing of a transformer 16 to prevent arcing between the transmission line 14 and the transformer 16.

The guard 10 includes a pair of semi-circular shaped body portions 18a and 18b constructed of an insulating material, such as plastic. The body portions 18a and 18b are connected together by a connecting wire 20 so that the body portions 18a and 18b are arranged to define a substantially circular slot 22 for receiving the transformer insulator 12. As shown in FIG. 2, the body portions 18a and 18b are spaced apart so that the slot 22 is sized such that the guard 10 can be disposed about the insulator 12 in an annular recess 24 formed in the insulator 12.

The connecting wire 20 is constructed of a material having a spring quality so that the body portions 18a and 18b are movable between a clamping position wherein body portions 18a and 18b are biased toward one another and an insertion position wherein the body portions 18a and 18b are deflected away from one another to enable the guard 10 to be slidably disposed onto the insulator 12 via an insulator receiving passageway 26 (FIG. 1) defined by the free ends of the body portions 18a and 18b. The further enhance the biasing force of the connecting wire 20, a spring 21 can be attached to the connecting wire substantially as shown in FIG. 1. The connecting wire 20 has a shape which defines a rear loop 28 and a pair of lateral loops 30.

The guard 10 further includes a plurality of prongs 32 extending radially outward from the body portions 18a and 18b to prevent an animal, such as a squirrel, from being able to make simultaneous contact with the transformer 16 and the transmission line 14 when the guard 10 is installed on the insulator 12.

As mention above, the guard 10 is adapted to be grasped by a "shotgun" stick (not shown) which is constructed of an insulated material and has a retractable claw mechanism on one end. The rearward extending loop 28 of the guard 10 is adapted to receive the claw. The problem with using a "shotgun" stick to position the guard 10 on the insulator 12 is that the "shotgun" stick grasps the guard 10 in such a manner that the guard 10 extends from the "shotgun" stick along the longitudinal axis of the "shotgun" stick. Consequently, installation of the guard 10 on the insulator 12 with a "shotgun" stick requires that a workman be positioned substantially level with the insulator 12 which, as mentioned above, increases the chances of the workman being injured.

Figure 3:
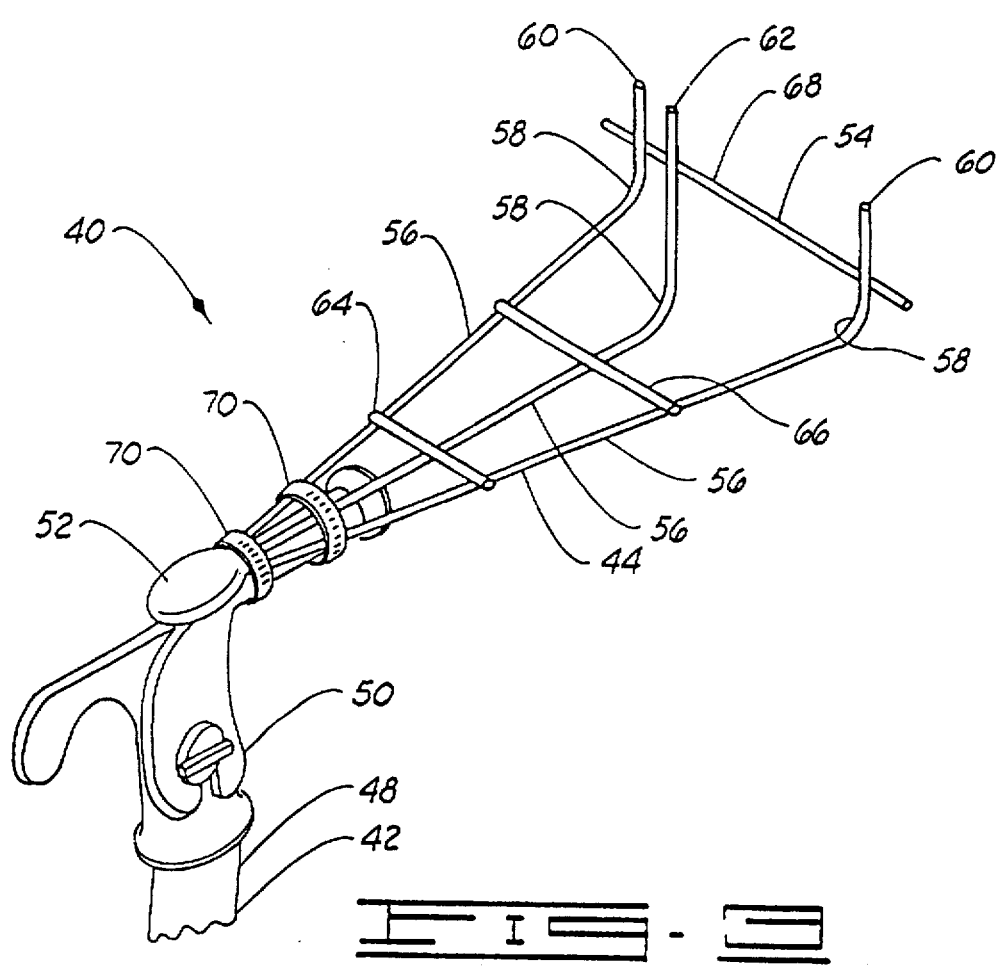
FIG. 3 is a perspective view of an animal guard applicator constructed in accordance with the present invention.

FIG. 3 shows an applicator assembly 40 constructed in accordance with the present invention. The applicator assembly 40 includes an elongated pole 42 and a guard applicator 44. The combination of the elongated pole 42 and the guard applicator 44 enables the guard 10 to be positioned on the insulator 12 quickly and safely without requiring a workman to climb a utility pole and in turn risk serious injury.

As best shown in FIG. 5, the pole 42 is characterized as having a first end 46 positionable near the ground and a second end 48 extendible so that the second end 48 is positionable adjacent the insulator 12. In order for the pole 42 to be positionable adjacent the insulator 12, the pole 42 may be provided with a length sufficient for the pole 42 to extend from the ground to the insulator 12. It is preferable, however, for the first and second ends 46, 48 of the pole 42 to be disposed in a telescoping relationship wherein the second end 48 is positionable between a retracted position and an extended position. It is also desirable that the pole 42 be constructed of an electric insulating material, such as fiberglass. An example of a suitable telescoping pole is one known in the industry as an "extendo stick". Such devices are typically used to replace blown fuses and are thus provided with a fuse holding member or pole attachment 50 (FIG. 3) which is connectable on the second end 48 thereof and can be set at various angles with respect to the second end 48 of the pole 42.

The guard applicator 44 is also characterized as having a first end 52 and a second end 54. More particularly, the guard applicator 44 includes a plurality of rigid rods 56 arranged in a substantially fan-shaped configuration. One end of each of the rods 56 is connected to the other rods 56 at a point of convergence located at the first end 52 of the guard applicator 44. The rods 56 can be connected together in any suitable manner, such as by a weld. The opposite end of each of the rods 56 is provided with a bend 58 whereby the second end 54 of the guard applicator 44 is provided with a pair of outer prongs 60 and a center prong 62. The outer prongs 60 are spaced apart a distance so that the outer prongs 60 are slidably positionable through the lateral loops 30 of the guard 10. The center prong 62 is offset from the outer prongs 60 so that the center prong 62 is positionable through the rear loop 28 of the guard 10 for engaging a portion of the guard 10 and for stabilizing the guard 10 on the guard applicator 44 once the guard 10 has been positioned thereon.

The rods 56 are further connected together with cross members 64, 66, and 68. The cross members 64 and 66 are dimensioned to extend the width of the guard applicator 44 while the cross member 68 has a length which is greater than the width of the outer prongs 60 and greater than the width of the laterally extending loops 30 of the guard 10 so as to provide a support platform on which a portion of the laterally extending loops 30 can rest when the guard 10 is positioned on the guard applicator 44.

The guard applicator 44 is removably connected to the pole attachment 50 via any suitable means, such as a pair of metal bands 70.

Figure 4:
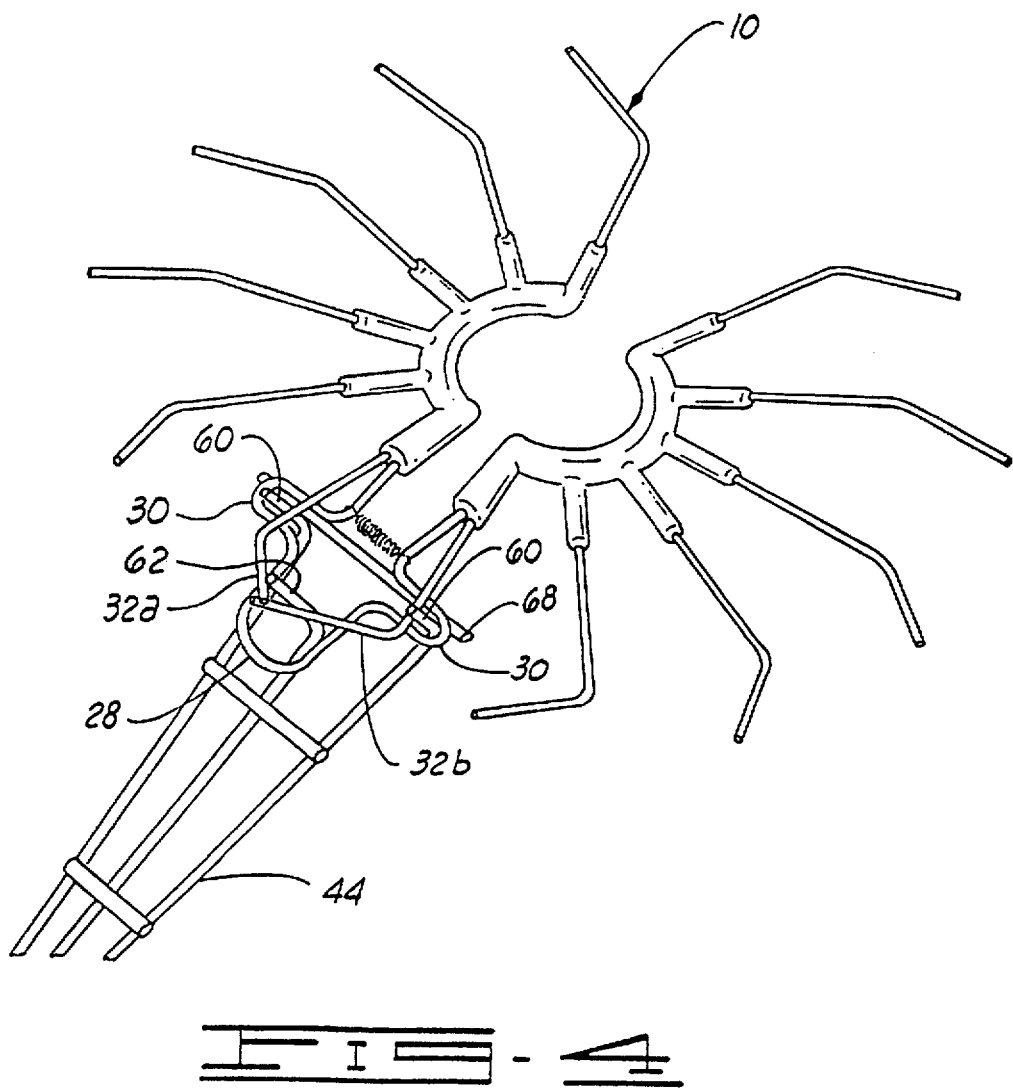
FIG. 4 is a fragmented perspective view of the guard of FIG. 3 shown with the squirrel guard of FIG. 1 positioned thereon.

In operation, the guard applicator 44 is connected to the pole 42 such that the prongs 60 and 62 of the guard applicator 44 extend in an upwardly direction when the pole 42 is in a substantially vertical orientation, as shown in FIG. 5. The guard 10 is positioned on the guard applicator 44 by placing the guard 10 on the guard applicator 44 so that the outer prongs 60 are extended through the laterally extending loops 30 of the guard 10 with a portion of the lateral loops 30 supportingly engaged on the cross member 68 (FIG. 4). The center prong 62 is positioned through the rear loop 28 of the guard 10 where the center prong 62 serves to stabilize the guard 10 on the guard applicator 44 by engaging a pair of the prongs 32a and 32b of the guard 10.

The guard 10 is positioned on the insulator 12 by first extending the pole 42 the necessary distance so that the guard applicator 44 can be positioned laterally adjacent to the insulator 12. The guard 10 is positioned adjacent to the insulator 12 so that the insulator receiving passageway 26 is aligned with the annular recess 24 of the insulator 12. With the insulator receiving passageway 26 aligned with the annular recess 24 of the insulator 12, the pole 42 is used to move the guard applicator 44 laterally so that the guard 10 is slidably disposed in the annular recess 24 of the insulator 12 and thereby secured about the insulator 12. The pole 42 is then manipulated to cause the second end 48 to be lowered thereby pulling the guard applicator 44 in a downward direction so that the center prong 62 and the outer prongs 60 of the guard applicator 44 are pulled out of the rear loop 28 and the lateral loops 30, respectively, leaving the guard 10 positioned on the insulator 12.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. An animal guard in combination with an apparatus for positioning the animal guard on an insulator elevated a remote distance above the ground by an individual located on the ground, the guard including a pair of body portions joined by a connecting wire so that the body portions are arranged to define a substantially circular slot for receiving the insulator, the body portions movable between a clamping position wherein body portions are biased toward one another and an insertion position wherein the body portions are deflected away from one another to enable the guard to be slidably disposed onto the insulator, the connecting wire configured to form a rear loop and a pair of lateral loops, the apparatus comprising:

an elongated pole having a first end positionable near the ground and a second end extendible so that the second end is positionable adjacent the insulator; and a guard applicator having a first end and a second end, the first end connected to the second end of the elongated pole at an angular relationship with respect to the second end of the pole, the second end of the guard applicator having a pair of spaced apart outer prongs slidably positioned through the lateral loops of the guard and engaged with a portion of the lateral loops of the guard, and the second end of the guard applicator having a support surface positioned adjacent each of the outer prongs on which a portion of the lateral loops of the guard is supportingly engaged whereby the support surfaces cooperate with the outer prongs to support the guard in a substantially horizontal plane for installation on the insulator.

2. The combination of claim 1 wherein the guard applicator further comprises:

a center prong offset from the outer prongs, positioned through the rear loop of the guard, and engageable with a portion of the guard to stabilize the guard on the guard applicator.

3. The combination of claim 1 wherein the support surfaces are defined by a cross member connected to the outer prongs and having a width greater than the width of the lateral loops of the guard.

4. The combination of claim 1 wherein the applicator further comprises a plurality of rigid rods arranged in a substantially fan-shaped configuration, one end of each of the rods connected to the other rods at a point of convergence located at the first end of the applicator, the opposite end of each of the rods provided with a bend so as to form the outer prongs.

5. The combination of claim 3 wherein the applicator further comprises at least three rigid rods arranged in a substantially fan-shaped configuration, one end of each of the rods connected to the other rods at a point of convergence located at the first end of the applicator, the opposite end of each of the rods provided with a bend so as to form the outer prongs and the center prong.

* * * * *

UNITED STATES PATENT AND TRADEMARK OFFICE
CERTIFICATE OF CORRECTION

PATENT NO.    :  5,794,495

DATED         :  August 18, 1998

INVENTOR(S)   :  Dwight Anderson

It is certified that error appears in the above-identified patent and that said Letters Patent is hereby corrected as shown below:

Cover page, Abstract, line 12, between "pair" and "lateral", insert --of--;

Column 1, line 6, delete "by not by" and substitute therefor --but not by--;

Column 2, line 14, after "guard" and before "of" insert --applicator--;

Column 2, line 15, delete "squirrel" and substitute therefor --animal--; and

Column 2, line 50, delete "The" and substitute therefor --To--.

Signed and Sealed this

Twelfth Day of October, 1999

Q. TODD DICKINSON

*Attest:*

*Attesting Officer*                *Acting Commissioner of Patents and Trademarks*